United States Patent
Mutsuno

(10) Patent No.: US 9,602,682 B2
(45) Date of Patent: Mar. 21, 2017

(54) IMAGE FORMING APPARATUS, SYSTEM, AND METHODS OF CONTROLLING THESE, AND STORAGE MEDIUM

(71) Applicant: CANON KABUSHIKI KAISHA, Ohta-ku, Tokyo (JP)

(72) Inventor: Masahiro Mutsuno, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/976,681

(22) Filed: Dec. 21, 2015

(65) Prior Publication Data

US 2016/0105572 A1 Apr. 14, 2016

Related U.S. Application Data

(63) Continuation of application No. 14/568,856, filed on Dec. 12, 2014, now Pat. No. 9,258,439.

(30) Foreign Application Priority Data

Dec. 20, 2013 (JP) .................................. 2013-264503

(51) Int. Cl.
- G06F 3/12 (2006.01)
- H04N 1/00 (2006.01)

(52) U.S. Cl.
CPC ......... *H04N 1/00244* (2013.01); *G06F 3/121* (2013.01); *G06F 3/1234* (2013.01); *G06F 3/1236* (2013.01); *G06F 3/1239* (2013.01); *G06F 3/1285* (2013.01); *H04N 1/00015* (2013.01); *H04N 1/00061* (2013.01); *H04N 1/00084* (2013.01); *H04N 1/00204* (2013.01); *H04N 1/00344* (2013.01); *H04N 1/00408* (2013.01); *H04N 2201/0074* (2013.01); *H04N 2201/0094* (2013.01)

(58) Field of Classification Search
CPC combination set(s) only.
See application file for complete search history.

(56) References Cited

U.S. PATENT DOCUMENTS

| 5,636,008 A | 6/1997 | LoBiondo et al. ............... 399/8 |
| 7,382,480 B2 | 6/2008 | Suzuki ......................... 358/1.15 |
| 7,603,189 B2 | 10/2009 | Tanaka et al. ................... 700/83 |
| 7,899,165 B2 | 3/2011 | Horie ....................... 379/100.01 |
| 8,464,146 B2 | 6/2013 | Kang ............................. 715/234 |
| 8,531,705 B2 | 9/2013 | Ishikura ..................... 358/1.15 |
| 8,560,738 B2 | 10/2013 | Aritomi .......................... 710/8 |
| 2005/0141020 A1* | 6/2005 | Harano ............... G06K 15/005 358/1.15 |

(Continued)

FOREIGN PATENT DOCUMENTS

JP 2005-208974 A 8/2005

*Primary Examiner* — Dung Tran
(74) *Attorney, Agent, or Firm* — Fitzpatrick, Cella, Harper & Scinto

(57) ABSTRACT

An image forming apparatus, in a case where in a remote control instruction received from an information processing apparatus that controls a maintenance, a screen to be displayed next is a restricted screen, if a predetermined input is not accepted from a user of the image forming apparatus, does not display the restricted screen to the operation unit, and if the predetermined input is accepted, does display the restricted screen to the operation unit.

13 Claims, 6 Drawing Sheets

(56) References Cited

U.S. PATENT DOCUMENTS

| | | | |
|---|---|---|---|
| 2006/0290680 A1* | 12/2006 | Tanaka | H04N 1/00204 345/173 |
| 2009/0237725 A1 | 9/2009 | Hamaguchi | 358/1.15 |
| 2009/0257083 A1 | 10/2009 | Ishikura | 358/1.15 |
| 2013/0141749 A1 | 6/2013 | Chiba | 358/1.14 |
| 2013/0208306 A1 | 8/2013 | Fukasawa | 358/1.15 |
| 2013/0222840 A1 | 8/2013 | Hosoda | 358/1.14 |
| 2014/0268226 A1 | 9/2014 | Yoshida et al. | 358/1.15 |
| 2014/0279570 A1 | 9/2014 | Yoshida et al. | 705/305 |
| 2015/0181057 A1 | 6/2015 | Mutsuno | 358/1.14 |

* cited by examiner

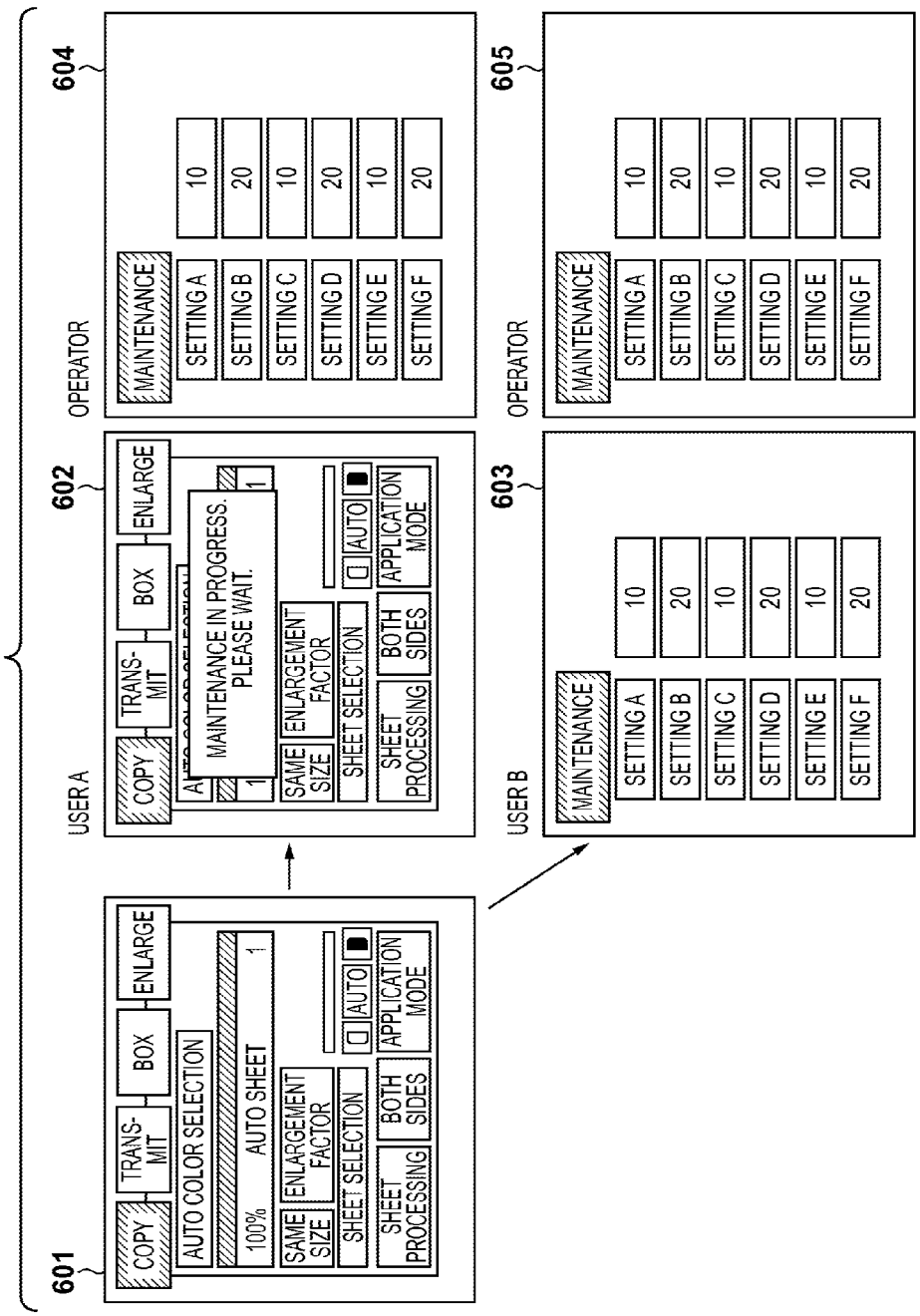

IMAGE FORMING APPARATUS, SYSTEM, AND METHODS OF CONTROLLING THESE, AND STORAGE MEDIUM

CROSS-REFERENCE TO RELATED APPLICATION

This application is a continuation of U.S. application Ser. No. 14/568,856, filed on Dec. 12, 2014, the entire disclosure of which is incorporated by reference herein. This application also claims foreign priority under 35 U.S.C. §119 of Japanese Patent Application No. 2013-264503, filed on Dec. 20, 2013.

BACKGROUND OF THE INVENTION

Field of the Invention

The present invention relates to an image forming apparatus that uses a remote maintenance service, a system, and methods of controlling these, and a storage medium.

Description of the Related Art

In Japanese Patent Laid-Open No. 2005-208974, a remote maintenance service performed by audio and moving image communication and remote control for a multi function peripheral is proposed. In the remote maintenance service, it is possible to solve a problem upon an error occurrence on the multi function peripheral by a call-center conveying an error solving approach directly to a user without a worker (hereinafter referred to as a serviceman) going to a site in order to perform maintenance. With this, it becomes possible to shorten the time required to resolve the error. In this kind of remote maintenance service, it is effective to realize a connection to the call-center using communication means of the multi function peripheral without the user using an apparatus other than the multi function peripheral such as a telephone device or a PC. In general, a connection from the Internet towards an information terminal that is blocked by a firewall is restricted. Meanwhile, a connection to the Internet from the information terminal that is within the firewall is permitted if HTTP which has a high affinity with the firewall is used. Thus, with two information terminals blocked by firewalls, it is possible to realize a session establishment between the information terminals by performing connections from each of the information terminals to a relay server to which connection as an HTTP client is possible. By using such communication means, it becomes possible for a user to use a call-center at a wider range if an environment is such that connection to the Internet is possible.

However, there is a problem with the above described conventional technique as recited below. For example, there are cases in which, in a remote maintenance service, a setting that normally is not displayed on the user side, such as an initial setting of the multi function peripheral, is performed by an instruction or an operation from the call-center side depending on the contents of the maintenance or the contents of the trouble. For example, in a case of a device glitch, a device maintenance screen is displayed such as one for settings that only the serviceman performs if it is not the case of the remote maintenance. In such a screen, there are settings that are only publicized to those who understand maintenance contents, and are only publicized to limited users such as the serviceman so that a setting for which an operation cannot be guaranteed is not performed intentionally. Meanwhile, there is a usage approach in which, with the remote maintenance service, not only the remote maintenance service requested so that the user can directly solve the problem, but also a serviceman that went to a site, using knowledge from the call-center, performs maintenance on the device using the remote maintenance service. Also, there is the possibility that the maintenance screen is continuously displayed even in a scene in which it is not desired that the maintenance screen be displayed in a case where the remote maintenance service is performed using the above described conventional technique.

SUMMARY OF THE INVENTION

The present invention enables realization of an arrangement for displaying a maintenance screen of a device only for a particular user when using a remote maintenance service.

One aspect of the present invention provides an image forming apparatus comprising: a connection unit configured to establish a connection with an information processing apparatus that controls a maintenance; a reception unit configured to receive a remote control instruction from the information processing apparatus connected to by the connection unit; and a display control unit configured to, in a case where, when the remote control instruction is received by the reception unit, a screen to be displayed next is a restricted screen, if a predetermined input is not accepted from a user of the image forming apparatus, not display the restricted screen to an operation unit and if the predetermined input is accepted, display the restricted screen to the operation unit.

Another aspect of the present invention provides a system including an image forming apparatus, and an information processing apparatus that controls a maintenance of the image forming apparatus, wherein the image forming apparatus comprises: a connection unit configured to establish a connection with the information processing apparatus that controls a maintenance; a reception unit configured to receive a remote control instruction from the information processing apparatus connected to by the connection unit; and a display control unit configured to, in a case where, when the remote control instruction is received by the reception unit, a screen to be displayed next is a restricted screen, if a predetermined input is not accepted from a user of the image forming apparatus, not display the restricted screen to an operation unit, and if the predetermined input is accepted, display the restricted screen to the operation unit, and the information processing apparatus comprises: a transmission unit configured to transmit the remote control instruction to the image forming apparatus; and a control unit configured to, in a case where a screen to be displayed next is the restricted screen, irrespective of whether or not the predetermined input is accepted, display the restricted screen on the information processing apparatus.

Still another aspect of the present invention provides a method of controlling an image forming apparatus, the method comprising: establishing a connection with an information processing apparatus that controls a maintenance; receiving a remote control instruction from the connected information processing apparatus; and in a case where, when the remote control instruction is received, a screen to be displayed next is a restricted screen, if a predetermined input is not accepted from a user of the image forming apparatus, not displaying the restricted screen to an operation unit, and if the predetermined input is accepted, displaying the restricted screen to the operation unit.

Yet another aspect of the present invention provides a method of controlling a system including an image forming apparatus, and an information processing apparatus that controls a maintenance of the image forming apparatus, wherein the image forming apparatus: establishes a connection with the information processing apparatus that controls a maintenance; receives a remote control instruction from the connected information processing apparatus; and in a case where, when the remote control instruction is received, a screen to be displayed next is a restricted screen, if a predetermined input is not accepted from a user of the image forming apparatus, does not display the restricted screen to an operation unit, and if the predetermined input is accepted, does display the restricted screen to the operation unit, and the information processing apparatus: transmits the remote control instruction to the image forming apparatus; and in a case where a screen to be displayed next is the restricted screen, irrespective of whether or not the predetermined input is accepted, displays the restricted screen on the information processing apparatus.

Still yet another aspect of the present invention provides a non-transitory computer-readable storage medium storing a program for causing a computer to function as the image forming apparatus.

Further features of the present invention will be apparent from the following description of exemplary embodiments with reference to the attached drawings.

BRIEF DESCRIPTION OF THE DRAWINGS

FIG. 6 is a view for illustrating a display to an operation unit of a restricted screen in an embodiment.

DESCRIPTION OF THE EMBODIMENTS

Figure 1:
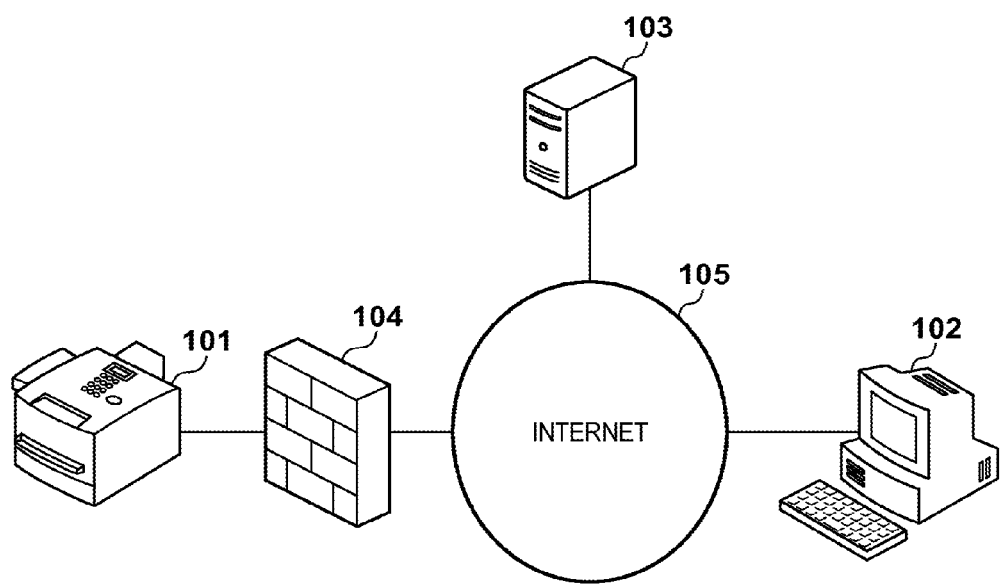
FIG. 1 is a view for illustrating a system configuration in an embodiment.

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

<System Configuration>

Below, explanation will be given for embodiments of the present invention with reference to FIG. 1 through FIG. 6. Firstly, explanation will be given for a configuration of a remote maintenance system according to the embodiment with reference to FIG. 1.

The remote maintenance system according to the embodiment is configured to include an image forming apparatus 101, a call-center terminal (information processing apparatus) 102, and a relay server 103. The image forming apparatus 101 and the call-center terminal 102, which are apparatuses to which the present invention is applied, have a remote maintenance function of audio and moving image communication, remote control, and the like, and operate as communication partners upon a remote maintenance. The relay server 103 is provided with an HTTP server communication function. The relay server 103 performs a session management between the image forming apparatus 101 and the call-center terminal 102. Here, an example in which a single image forming apparatus is included is shown, but the present invention is not limited to this, and a plurality of image forming apparatuses may be included.

The image forming apparatus 101 and the call-center terminal 102 are provided with HTTP client communication functions. The image forming apparatus 101 makes an HTTP connection with the relay server 103 over the Internet 105 through a firewall 104. The call-center terminal 102, similarly, makes an HTTP connection with the relay server 103. The image forming apparatus 101, via the relay server 103, performs data transmission and receiving with the call-center terminal 102.

The call-center terminal 102 according to the embodiment is a terminal that a maintenance operator of the call-center operates and is an information processing apparatus that is for maintenance. The call-center terminal 102 performs the role of performing remote maintenance on the image forming apparatus 101 by audio and moving image communication and remote control. Note, in this embodiment, an HTTP protocol is used for the connection between the image forming apparatus 101 and the relay server 103, but another communication protocol that has a high affinity with the firewall 104 may also be used. Note, in this embodiment, an HTTP protocol is used for the connection between the call-center terminal 102 and the relay server 103, but another communication protocol may be used. Note, in this embodiment, data transmission and receiving between the image forming apparatus 101 and the call-center terminal 102 may be performed by separately establishing a communication path that makes a direct connection from the image forming apparatus 101 to the call-center terminal 102 via the relay server 103.

<Image Forming Apparatus Hardware Configuration>

Figure 2:
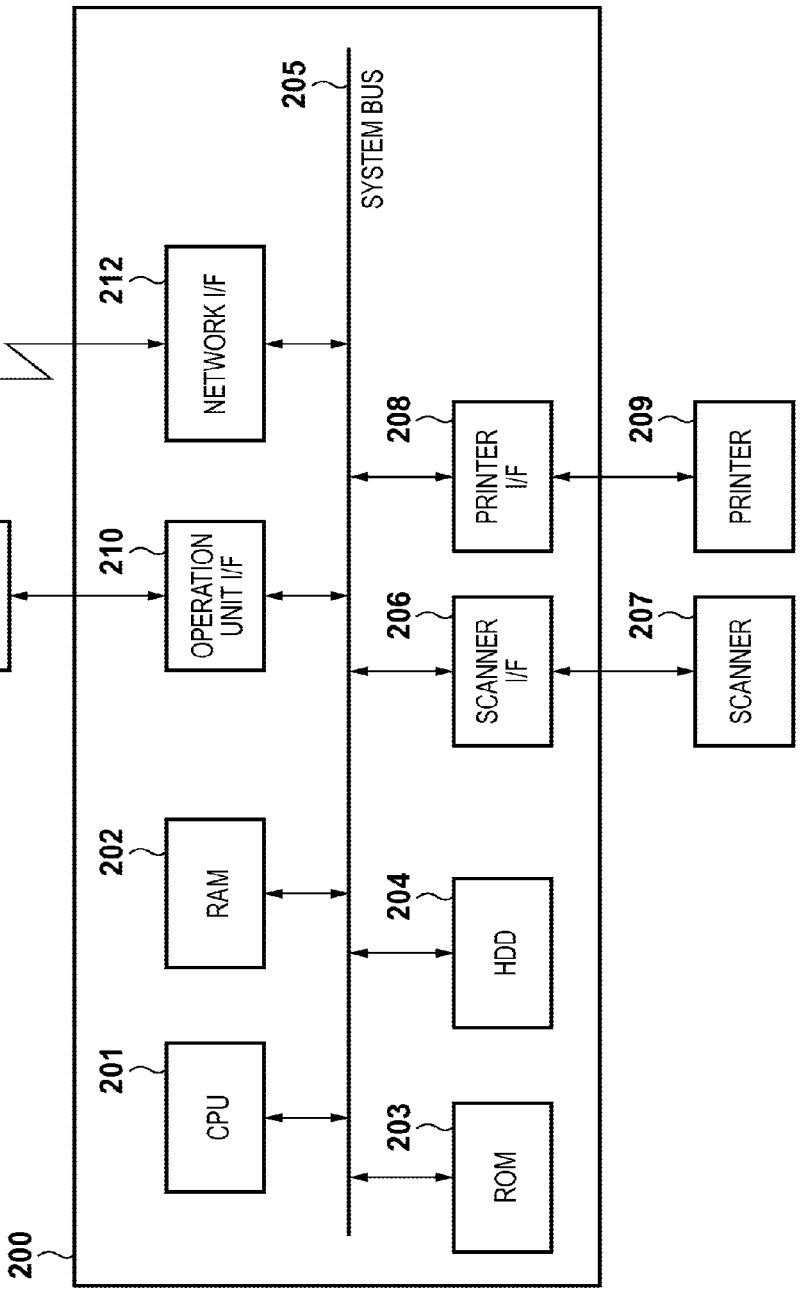
FIG. 2 is a view for illustrating a hardware configuration in an embodiment.

Next, explanation will be given for a hardware configuration of the image forming apparatus 101 according to the embodiment with reference to FIG. 2. The image forming apparatus 101 is equipped with a CPU 201, a RAM 202, a ROM 203, an HDD 204, a scanner I/F (interface) 206, a scanner 207, a printer I/F 208, a printer 209, an operation unit I/F 210, an operation unit 211, and a network I/F 212.

The CPU 201 performs overall control of access to various devices connected to a system bus 205 based on control programs stored in the ROM 203 or the hard disk drive (HDD) 204. The ROM 203 stores control programs that the CPU 201 is capable of executing. The RAM 202 mainly functions as a main memory, a work area, or the like, of the CPU 201, and configuration is taken such that a memory capacity can be extended by an option RAM connected to an expansion port (not shown). The HDD 204 stores a boot program, various applications, font data, user files, edit files, or the like. Note, in this embodiment, the HDD 204 is used, but other than the HDD 204 an SD card, or a flash memory may be used as an external storage apparatus.

The scanner I/F 206 controls image input from the scanner 207. The printer I/F 208 controls image output to the printer 209. The operation unit I/F 210 performs display control of the operation unit 211, and controls inputting of various setting information set by the operation unit 211. Reference numeral 212 is a network I/F which performs data communication with an external network via a network cable.

<Image Forming Apparatus Software Configuration>

Figure 3:
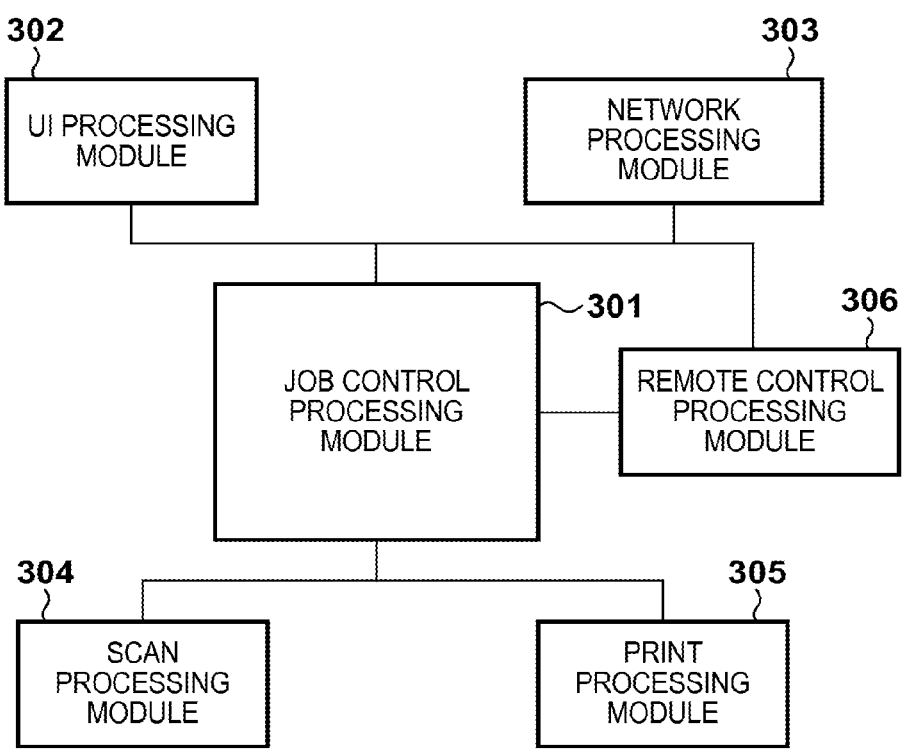
FIG. 3 is a view for illustrating a software configuration in an embodiment.

Next, explanation will be given for a software configuration of the image forming apparatus 101 according to the embodiment with reference to FIG. 3. Each software module shown here is operated mainly by the CPU 201. A job control processing module 301 controls comprehensively software modules shown graphically and not shown, and performs control of various jobs that are generated within the image forming apparatus such as those for copying, printing, scanning, and UI processing.

A UI processing module 302 performs control mainly for the operation unit 211 and the operation unit I/F 210. In addition to notifying the job control processing module 301 of contents of operations that the operator performed on the operation unit 211, the UI processing module 302 controls the display contents of display screens on the operation unit 211 based on instructions from the job control processing module 301. Also, it controls editing of rendering data for display to the operation unit 211.

A network processing module 303 is a module, for controlling communication with an external unit which is performed via the network I/F 212 mainly, which performs communication control for communication with various devices on a LAN. The network processing module 303 makes a notification to the job control processing module 301, when it receives a control command or data from a device on the LAN, of the content of what is received. Also, based on an instruction from the job control processing module 301, it performs transmission of a control command or data to a device on the LAN.

A scan processing unit 304, based on an instruction of the job control processing module 301, makes an instruction for reading an original placed on the scanner 207 by controlling the scanner 207 and the scanner I/F 206. A print processing module 305, based on instructions of the job control processing module 301, performs print processing for designated images by controlling the printer 209 and the printer I/F 208.

A remote control processing module 306, in accordance with call-center connection information settings stored in the HDD 204, acquires a URL of the relay server 103, and via the network processing module 303 makes a connection to the relay server 103. In an established session, via the network processing module 303, the remote control processing module 306 performs data transmission and receiving by audio, moving image and remote control. Also, the remote control processing module 306 analyzes data received via the network processing module 303, and performs control of the UI processing module 302 as necessary.

<Processing Procedure>

Figure 4:
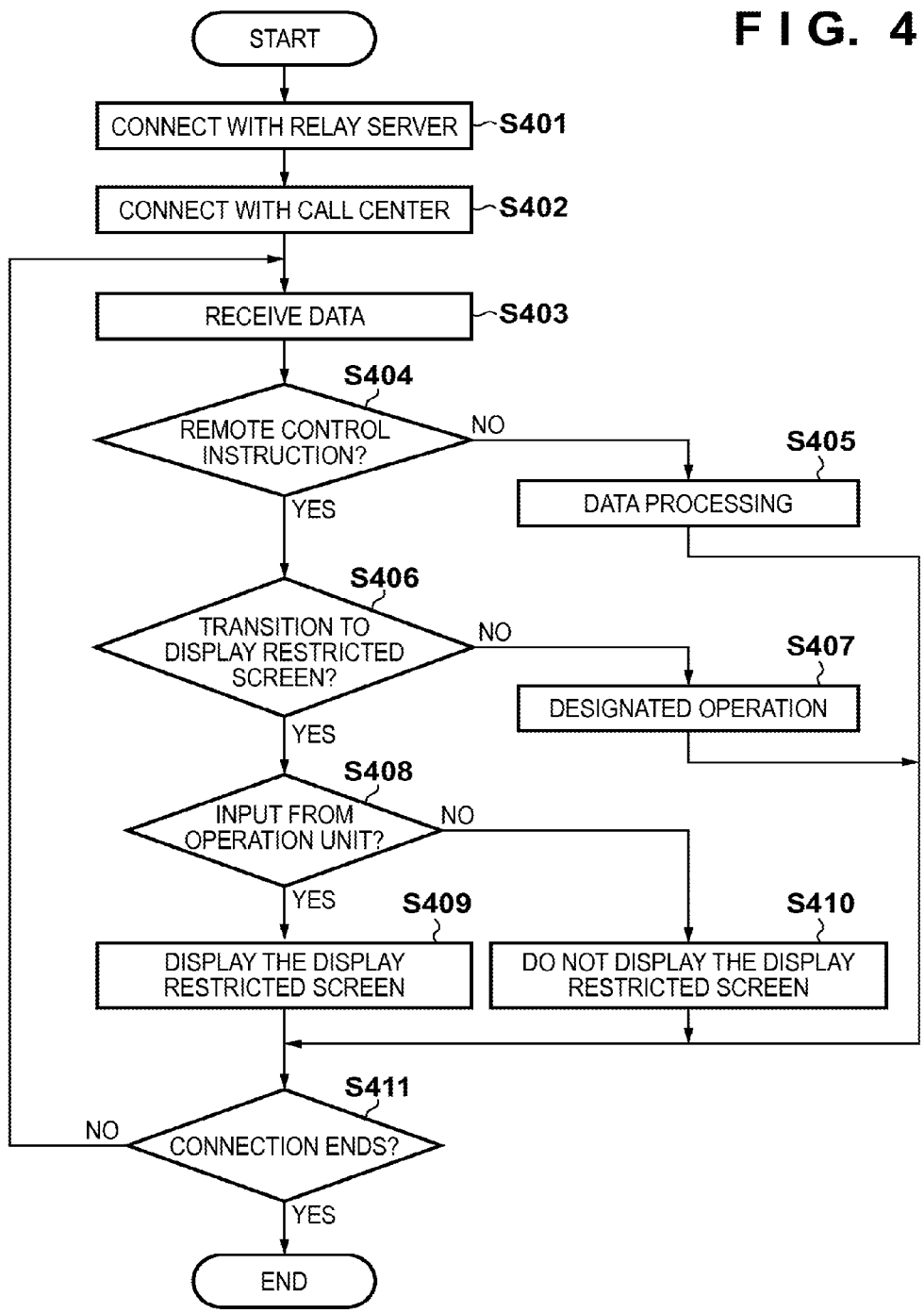
FIG. 4 is a view for illustrating a remote processing flowchart in an embodiment.
Figure 5:
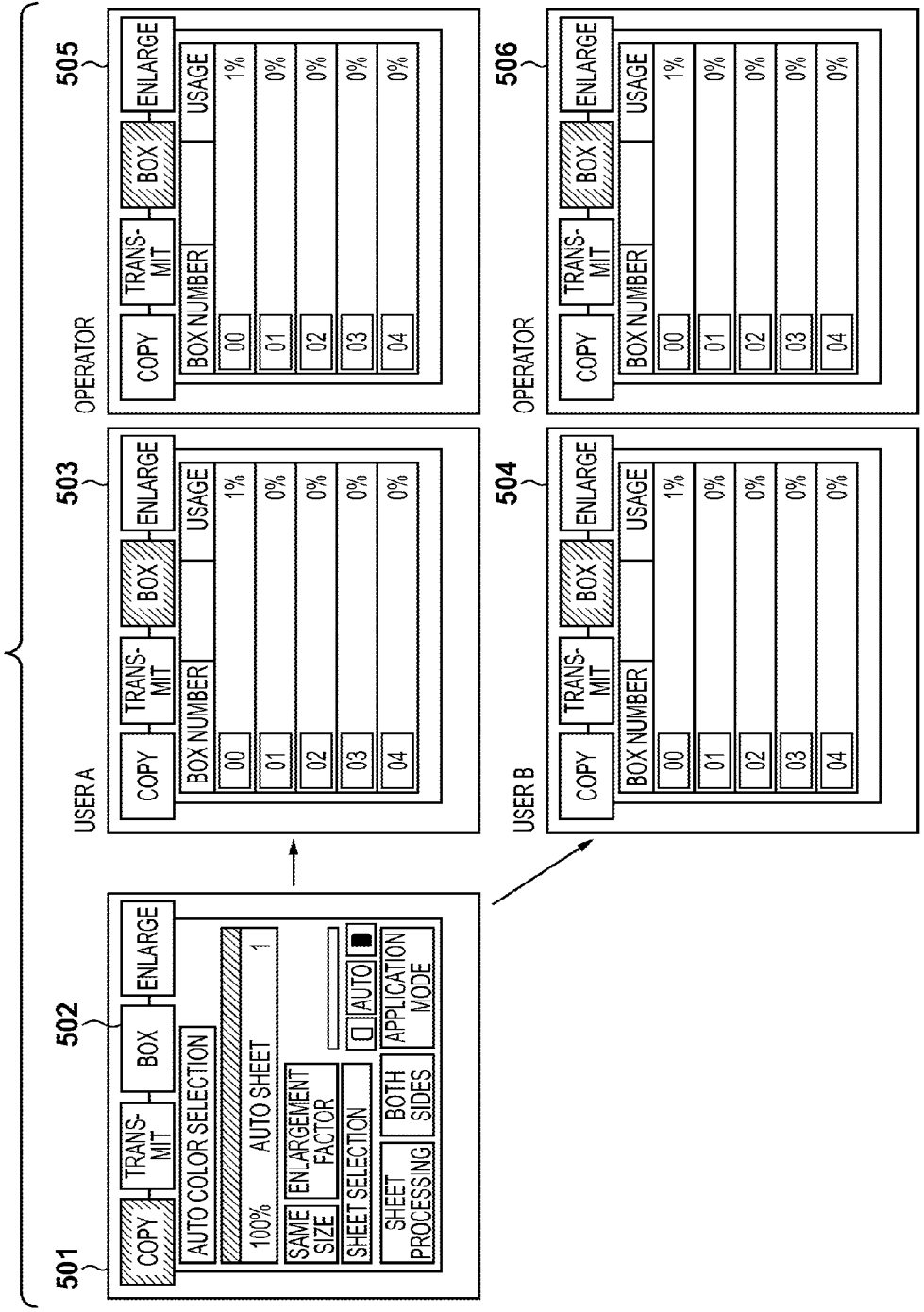
FIG. 5 is a view for illustrating a display to an operation unit other than a restricted screen in an embodiment.

Next, with reference to FIG. 4 through FIG. 6, explanation will be given for a processing procedure for communication processing in the image forming apparatus 101 for communication with the call-center terminal 102 via the relay server 103, and examples of screens. The processing explained below is realized by a control program stored in the HDD 204 being read out into the RAM 202, and executed by the CPU 201.

In step S401, the remote control processing module 306 accepts a call-center call instruction from the UI processing module 302. The remote control processing module 306 reads out the URL of the relay server 103 from the HDD 204, and makes an HTTP connection to the relay server 103. Continuing on, in step S402, the remote control processing module 306 establishes a session with the call-center terminal 102 via the relay server 103.

In step S403, the remote control processing module 306, transmits and receives, with the call-center terminal 102, audio, moving image, or remote control data via the network processing module 303 in the session established in step S402. With this, remote control is initiated between the user of the image forming apparatus 101 with the operator of the call-center terminal 102. In step S404, the remote control processing module 306 determines whether or not the data received in step S403 is a remote control instruction. The remote control instruction indicates data for performing a remote control other than that for audio and moving images. If there is a remote control instruction, the processing proceeds to step S406, and if not, the processing proceeds to step S405. In step S405, the remote control processing module 306 makes a request for performing data processing for audio or a moving image, or the like, to the UI processing module 302, and the processing proceeds to step S411.

Meanwhile, in step S406, the remote control instruction is received from the remote control processing module 306, and the UI processing module 302 determines whether or not to transition to a display restricted screen. Here the display restricted screen indicates a screen for maintenance that a serviceman performs, or a screen for an administrator mode to which transition is prohibited for a general user. If there is a transition to a display restricted screen, the processing proceeds to step S408, and if not, the processing proceeds to step S407.

In step S407, the UI processing module 302 executes the designated screen transition, operation, or the like, and the processing proceeds to step S411. FIG. 5 indicates screen transitions in a case where there is not the transition to the display restricted screen. Irrespective of whether the user of the image forming apparatus 101 is a user A(common user), or a user B (the serviceman), it is shown that transition is made to similar screens 503 and 504. The screen currently being displayed on the operation unit 211 is reference numeral 501, and a screen for copying is being displayed. By an instruction from the call-center terminal 102, a remote control instruction that the button 502 for transition to a box screen is pressed, is received. In the case where the user that requested the remote control of the call-center on the image forming apparatus 101 is the user A, transition is made to the box screen 503, and the screen is displayed. Also, in a case where the user that requested the remote control of the call-center on the image forming apparatus 101 is the user B, who is the serviceman, similarly transition is made to the box screen 504 and the screen is displayed. On the side of the operator of the call-center terminal 102, box screens 505 and 506 are displayed irrespective of whether it is the user A or the user B (the serviceman).

The explanation will now return to FIG. 4. In step S408, the UI processing module 302 determines whether or not a predetermined key input (predetermined input) is accepted from the operation unit 211. Here the predetermined key input is an input of an instruction that the display restricted screen be displayed, for example, and may be the input of a password performed in order to display the display restricted screen. In this way, in this embodiment, for determination of whether or not to display the display restricted screen, a determination condition for determining whether or not there is the predetermined key input is assumed, but this is only one example, and another approach may also be applied. For example, it may be determined based on an ID of the user that is currently logged into the image forming apparatus 101. In other words, here it is sufficient that it can be determined what kind of user the user is, i.e. whether or not the user is the serviceman, for example. In a case where the key input is accepted, the processing proceeds to step S409, and when that is not the case, the processing proceeds to step S410. In step S409, the UI processing module 302 executes the transition to the display restricted screen, and the processing proceeds to step S411. Meanwhile, in step S410, the UI processing module 302 does not execute the transition to the display restricted screen, and the processing proceeds to step S411.

FIG. 6 indicates screen transitions in a case where there is the transition to the display restricted screen. It is shown that there exists a case in which transition is not made to the display restricted screen, and a case in which transition is made to the display restricted screen upon the key input from the operation unit 211 for the cases where the user of the image forming apparatus 101 is the user A and where the user is the user B (the serviceman) respectively. The screen currently being displayed on the operation unit 211 is reference numeral 601, and a screen for copying is being displayed. Here, by an instruction from the call-center terminal 102, a remote control instruction for a transition to the maintenance screen is received. In the case where the user that requested the remote control of the call-center on the image forming apparatus 101 is the user A, transition is made to a screen 602 in which the maintenance screen is not displayed. Also, in the case where the user that requested the remote control of the call-center on the image forming apparatus 101 is the user B who is the serviceman, the maintenance screen 603 is displayed in a case where the key operation is performed from the operation unit 211 to the maintenance screen. On the side of the operator of the call-center terminal 102, maintenance screens 604 and 605 are displayed irrespective of whether it is the user A or the user B (the serviceman).

In this way, in a case where the maintenance screen is displayed, whether or not to display the maintenance screen is switched depending on the user that operates the image forming apparatus 101. More specifically, if the user is a user that uses the maintenance screen such as the serviceman, the image forming apparatus 101 displays the maintenance screen to the operation unit 211. On the other hand, if it is another user, a pop-up stating that the screen transition cannot be performed because maintenance is in progress is displayed as shown in reference numeral 602. With this, in the present embodiment, only a particular user is able to display the maintenance screen. Meanwhile, as in FIG. 5, in the transition to a normal operation screen, e.g. the transition to the copy screen, an operation screen is displayed for all users without providing a restriction based on the user.

The explanation will now return to FIG. 4. In step S411, the remote control processing module 306 determines whether or not the connection between the relay server 103 and the call-center terminal 102 ends. If it has ended, the processing ends. If it has not ended, the processing returns to step S403, and data is transmitted and received between the relay server 103 and the call-center terminal 102.

As explained above, in a case where a transition to a display restricted screen is designated by a remote control instruction during remote maintenance, it becomes possible to display the display restricted screen as necessary. In other words, only a user that can perform device maintenance is able to display a maintenance screen of a multi function peripheral device during remote maintenance of a multi function peripheral by a call-center.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-264503 filed on Dec. 20, 2013, which is hereby incorporated by reference herein in its entirety.

What is claimed is:

1. An image processing apparatus comprising:
at least one memory device that stores a set of instructions; and
at least one processor that executes instructions, of the set of instructions, to:
establish a connection with an information processing apparatus that remotely maintains the image processing apparatus;
receive, from the connected information processing apparatus, a transition instruction of a screen; and
display a first screen on an operation unit according to the received transition instruction to the first screen,
wherein a display of a second screen on the operation unit according to the received transition instruction to the second screen is restricted,
wherein, in accordance with the transition instruction to the second screen, the second screen is displayed on a display of the information processing apparatus, and
wherein, in a case where the transition instruction to the second screen is received and a predetermined operation is input through the operation unit, the second screen is displayed on the operation unit.

2. The image processing apparatus according to claim 1, wherein the instructions further comprise instructions to display the second screen on the operation unit of the image processing apparatus if a predetermined input is accepted from a user in a case where the transition instruction to the second screen is received.

3. The image processing apparatus according to claim 2, wherein the predetermined input is an input of an instruction for displaying the second screen.

4. The image processing apparatus according to claim 2, wherein the predetermined input is an input of a password for displaying the second screen.

5. The image processing apparatus according to claim 1, wherein, while the second screen is controlled not to display on the operation unit according to the transition instruction to the second screen, information indicating that remote maintenance is in progress is displayed on the operation screen.

6. The image processing apparatus according to claim 1, wherein the second screen is a specific screen on which a serviceman performs maintenance of the image processing apparatus.

7. The image processing apparatus according to claim 6, wherein the first screen is a screen other than the specific screen.

8. The image processing apparatus according to claim 1, wherein the instructions further comprise instructions to establish the connection with the information processing apparatus via a relay server.

9. The image processing apparatus according to claim 8, wherein the instructions further comprise instructions to connect with the relay server using an HTTP protocol, and establish a session between the connected relay server and the information processing apparatus using the HTTP protocol.

10. The image processing apparatus according to claim 1, wherein the instructions further comprise instructions to read an image on an original and generate image data.

11. The image processing apparatus according to claim 1, wherein the instructions further comprise instructions to print an image on a sheet in accordance with image data.

12. A method of controlling an image processing apparatus that includes at least one memory device that stores a set of instructions and at least one processor that executes instructions of the set of instructions, the method comprising:
   establishing a connection with an information processing apparatus that remotely maintains the image processing apparatus;
   receiving, from the connected information processing apparatus, a transition instruction of a screen; and
   displaying, by a display controller, a first screen on an operation unit according to the received transition instruction to the first screen,
   wherein a display of a second screen on the operation unit according to the received transition instruction to the second screen is restricted,
   wherein, in accordance with the transition instruction to the second screen, the second screen is displayed on a display of the information processing apparatus, and
   wherein, in a case where the transition instruction to the second screen is received and a predetermined operation is input through the operation unit, the second screen is displayed on the operation unit.

13. A computer program product comprising a non-transitory computer-usable medium having control logic stored therein for causing a computer to function as a image processing apparatus that includes at least one memory device that stores a set of instructions and at least one processor that executes instructions of the set of instructions, the control logic comprising:
   first computer-readable program code for causing the at least one processor to establish a connection with an information processing apparatus that remotely maintains the image processing apparatus;
   second computer-readable program code for causing the at least one processor to receive, from the connected information processing apparatus, a transition instruction of a screen; and
   third computer-readable program code for causing the at least one processor to display a first screen on an operation unit according to the received transition instruction to the first screen,
   wherein a display of a second screen on the operation unit according to the received transition instruction to the second screen is restricted,
   wherein, in accordance with the transition instruction to the second screen, the second screen is displayed on a display of the information processing apparatus, and
   wherein, in a case where the transition instruction to the second screen is received and a predetermined operation is input through the operation unit, the second screen is displayed on the operation unit.

* * * * *